(12) United States Patent
Kim

(10) Patent No.: US 12,264,713 B2
(45) Date of Patent: Apr. 1, 2025

(54) BRAKE APPARATUS FOR VEHICLE

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 377 days.

(21) Appl. No.: 17/862,451

(22) Filed: Jul. 12, 2022

(65) Prior Publication Data
US 2023/0011037 A1 Jan. 12, 2023

(30) Foreign Application Priority Data
Jul. 12, 2021 (KR) ........................ 10-2021-0090925

(51) Int. Cl.
*F16D 55/227* (2006.01)
(52) U.S. Cl.
CPC ................................ *F16D 55/227* (2013.01)
(58) Field of Classification Search
CPC .................................................... F16D 55/227
See application file for complete search history.

(56) References Cited

U.S. PATENT DOCUMENTS

| | | | | |
|---|---|---|---|---|
| 4,019,611 A | * | 4/1977 | Ritsema | F16D 55/227 188/26 |
| 5,507,369 A | * | 4/1996 | Ferreira | F16D 55/227 188/219.1 |
| 6,062,349 A | * | 5/2000 | Boisseau | F16D 65/095 188/73.45 |
| 6,851,527 B2 | * | 2/2005 | Hoffrichter | F16D 69/04 188/251 A |
| 7,377,368 B2 | * | 5/2008 | Schog | F16D 65/095 188/73.31 |
| 7,484,601 B2 | * | 2/2009 | Baumann | F16D 65/568 188/71.9 |
| 2019/0063518 A1 | * | 2/2019 | Taylor | F16D 65/0972 |

FOREIGN PATENT DOCUMENTS

KR         10-0610067 B1     8/2006

* cited by examiner

*Primary Examiner* — Melanie Torres Williams
(74) *Attorney, Agent, or Firm* — Novo TechIP International PLLC

(57) ABSTRACT

A brake apparatus for a vehicle may include: a first brake pad configured to press a brake disc; a second brake pad disposed to face the first brake pad and coming into contact with the brake disc; a pressing part configured to press the first brake pad to move toward the second brake pad; a caliper body on which the pressing part is mounted and enclosing the first brake pad and the second brake pad; and a pair of pin members that are screw-coupled to the caliper body so as to be separated from each other and configured to pass through the first brake pad and the second brake pad.

7 Claims, 5 Drawing Sheets

BRAKE APPARATUS FOR VEHICLE

CROSS-REFERENCE TO RELATED APPLICATIONS

This application claims the benefit under 35 U.S.C. § 119(a) of priority to Korean Patent Application No. 10-2021-0090925 filed on Jul. 12, 2021 in the Korean Intellectual Property Office, the entire disclosure of which is incorporated herein by reference for all purposes.

BACKGROUND

1. Technical Field

Exemplary embodiments of the present disclosure relate to a brake apparatus for a vehicle, and more particularly, to a brake apparatus for a vehicle in which manufacturing costs are saved by reducing the number of components, and assembly time is reduced by simplifying an assembly process.

2. Discussion of Related Art

In general, a brake apparatus for a vehicle provides braking force by contact between a brake pad and a brake disc which belong to the brake apparatus for braking, and is formed of a plurality of parts. The brake apparatus for a vehicle includes a pair of brake pads that are disposed on opposite sides of the brake disc, a caliper body that encloses the pair of brake pads, and pin members that are mounted in the caliper body, are coupled to the pair of brake pads, and guide movement of the brake pads.

However, pin clips are required to mount the pin members in the caliper body, which causes a problem with an increase in the number of required components and thus an increase in manufacturing costs. Further, the pin members can be coupled to the caliper body when the pin clips have to be coupled to the caliper body, and can be decoupled from the caliper body when the pin clips have to be decoupled from the caliper body. For this reason, an assembly process and a disassembly process may be complex and laborious. Thus, a means to ameliorate such problems is required.

The background of the present disclosure is disclosed in Korean Registered Patent No. 10-0610067 (registered on Aug. 1, 2006 and entitled "Disc Brake Caliper of Vehicles").

SUMMARY

Accordingly, the present disclosure has been made with the above problems occurring in the related art in mind, and the present disclosure is intended to propose a brake apparatus for a vehicle in which expenses for components are saved by reducing the number of components, and an assembly time is reduced by simplifying an assembly process.

To achieve the above objective, a brake apparatus for a vehicle may include: a first brake pad configured to press a brake disc; a second brake pad disposed to face the first brake pad and coming into contact with the brake disc; a pressing part configured to press the first brake pad to move toward the second brake pad; a caliper body on which the pressing part is mounted and enclosing the first brake pad and the second brake pad; and a pair of pin members that are screw-coupled to the caliper body so as to be separated from each other and configured to pass through the first brake pad and the second brake pad.

Further, the caliper body may include: a first caliper body having insertion holes into which the pin members are inserted; a second caliper body on which the pressing part is mounted, facing the first caliper body and having a coupling hole part to which the pin members are screw-coupled; and a third caliper body which is disposed to be spaced apart from while between the first caliper body and the second caliper body, and connecting the first caliper body and the second caliper body.

Further, each of the pin members may include: a pin body passing through the first brake pad and the second brake pad and which is inserted into the insertion hole; a pin coupler connected to the pin body and is screw-coupled to the coupling hole part; and a pin head, connected to the pin coupler, is larger than the pin coupler, and comes into contact with the caliper body.

Further, the coupling hole part may be formed with second threads meshedly coupled to the first threads of the pin coupler.

Further, the coupling hole part may include: a first coupling hole part in which the pin head is disposed; and a second coupling hole part connected to the first coupling hole part and to which the second threads are provided.

Further, a length of the pin coupler may be shorter than that of the second coupling hole part.

Further, the first brake pad may include: a first back plate having a pair of first through-hole parts formed in a shape of a long hole through which the pair of pin members pass; and a first friction member coupled to the first back plate and comes into contact with the brake disc.

Further, the first through-hole part may have a shape of a long hole that is elongated in a left-right direction; and the first friction member may be formed of an elastic material.

Further, the second brake pad may include: a second back plate having a pair of second through-hole parts formed in a shape of a long hole through which the pair of pin members pass; and a second friction member coupled to the second back plate and comes into contact with the brake disc.

Further, the first through-hole part may have a shape of a long hole that is elongated in a left-right direction; and the first friction member may be formed of an elastic material.

Further, the second brake pad may include: a second back plate having a pair of second through-hole parts formed in a shape of a long hole through which the pair of pin members pass; and a second friction member coupled to the second back plate and comes into contact with the brake disc.

Further, the second through-hole part may have a shape of a long hole that is elongated in a left-right direction; and the second friction member may be formed of an elastic material.

Further, the brake apparatus may further include a brake pad clip section that is mounted on the pair of pin members and presses the first brake pad and the second brake pad.

In the brake apparatus for a vehicle according to the present disclosure, as the pin members are screw-coupled to the caliper body, the number of components is reduced, so that expenses for components are saved, and an assembly process is simplified so that an assembly time can be reduced.

DETAILED DESCRIPTION

Figure 1:
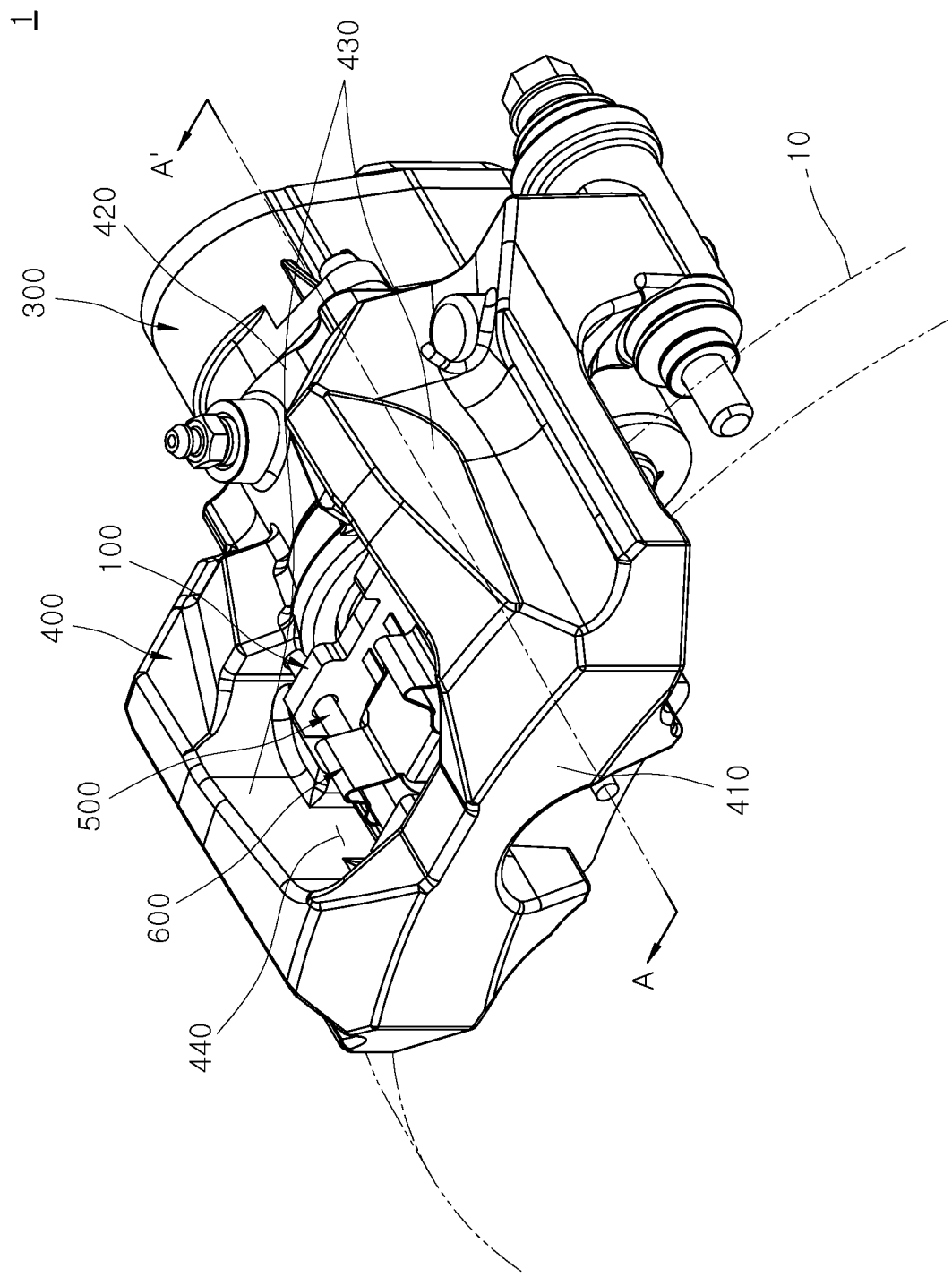
FIG. 1 is a diagram schematically illustrating a brake apparatus for a vehicle according to an embodiment of the present disclosure.

Hereinafter, a brake apparatus for a vehicle according to an embodiment of the present disclosure will be described below with reference to the accompanying drawings.

In the process, thicknesses of lines shown in the drawings and sizes of constituent elements may be exaggerated for clarity and convenience. Further, the following terms are defined, considering functions thereof in the present invention, and may be varied according to intentions and customs of a user or manager. Thus, the terms should be defined based on the contents of the entire specification.

Figure 2:
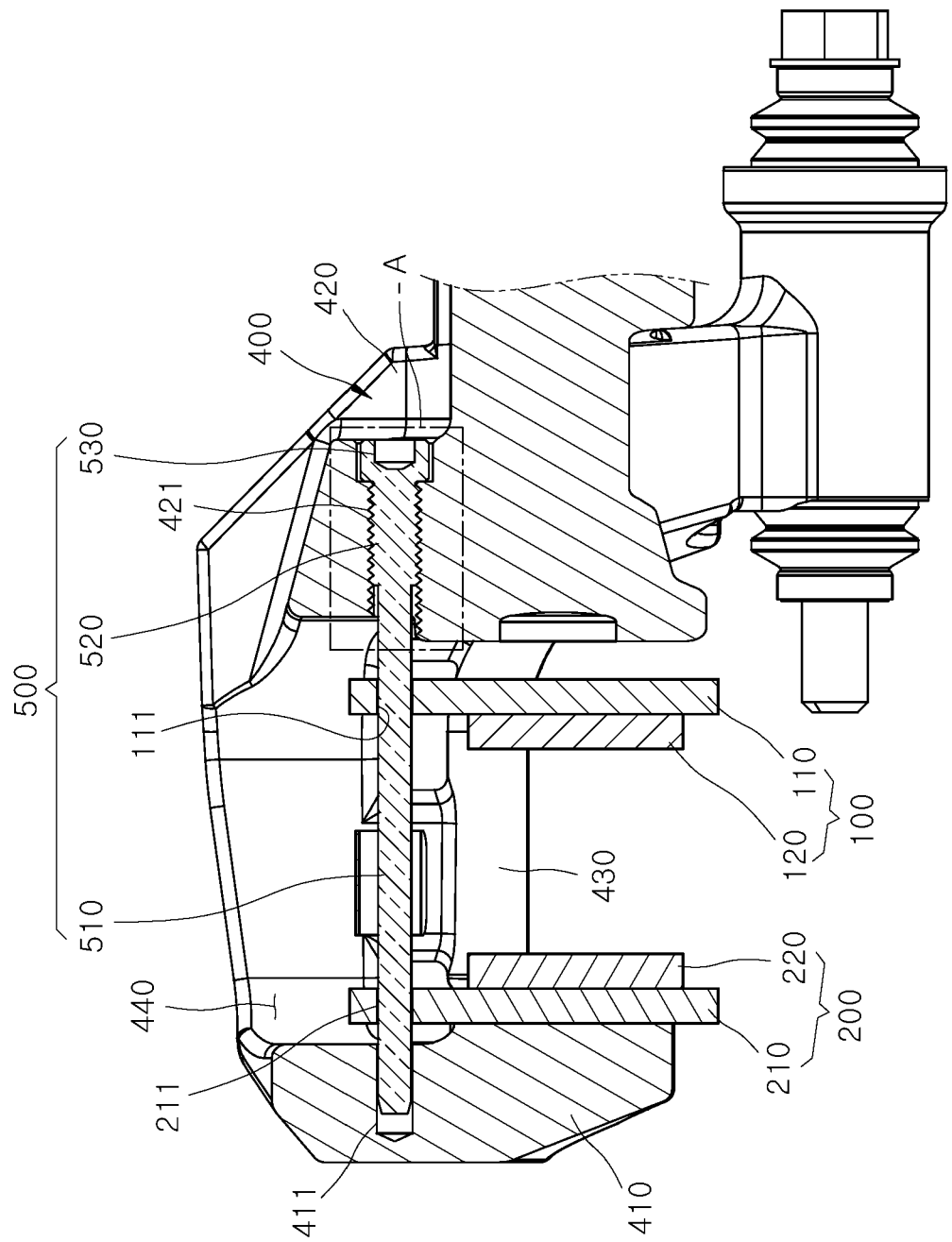
FIG. 2 is a cross-sectional view taken along line A-A' of FIG. 1.
Figure 3:
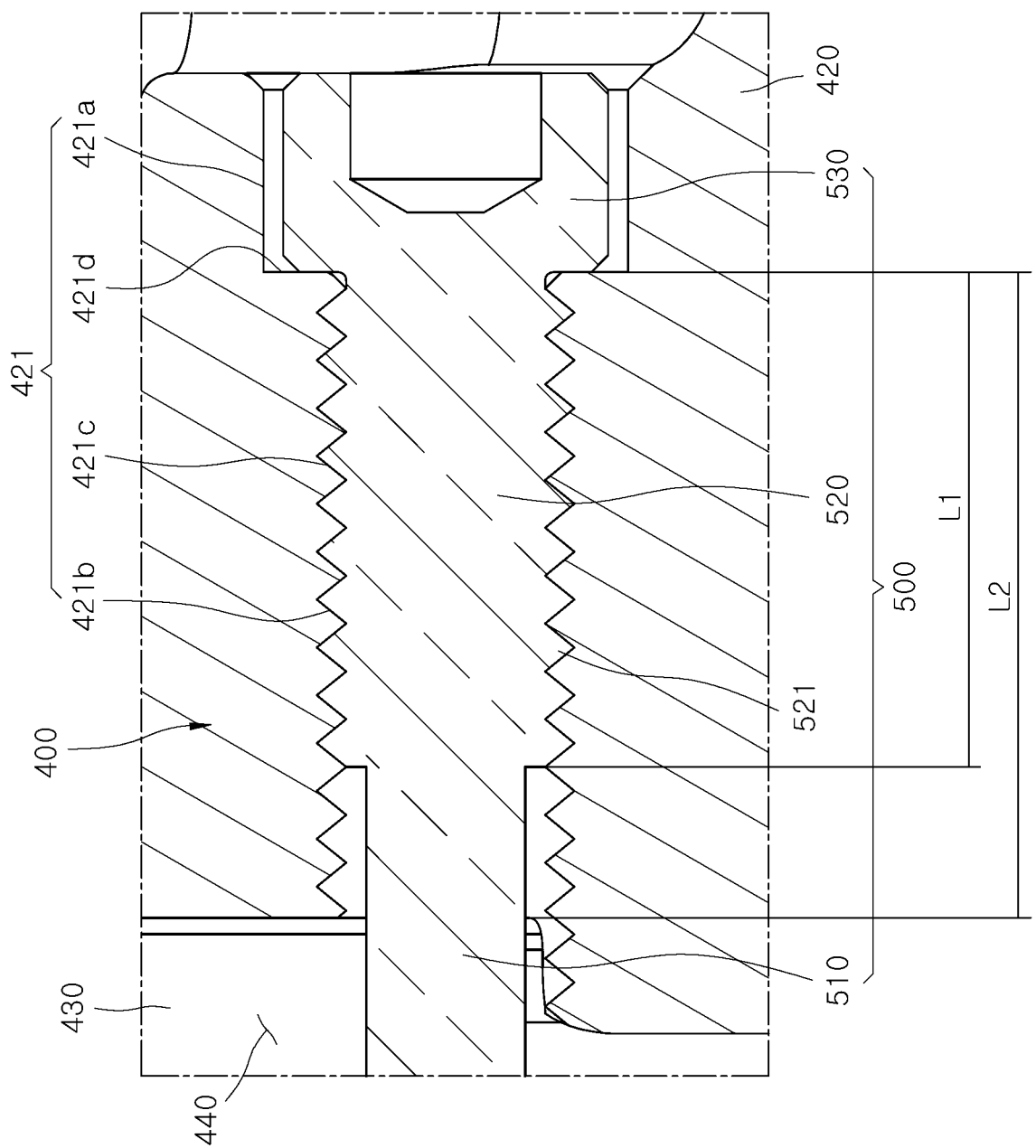
FIG. 3 is an enlarged view of a key part of FIG. 2.
Figure 4:
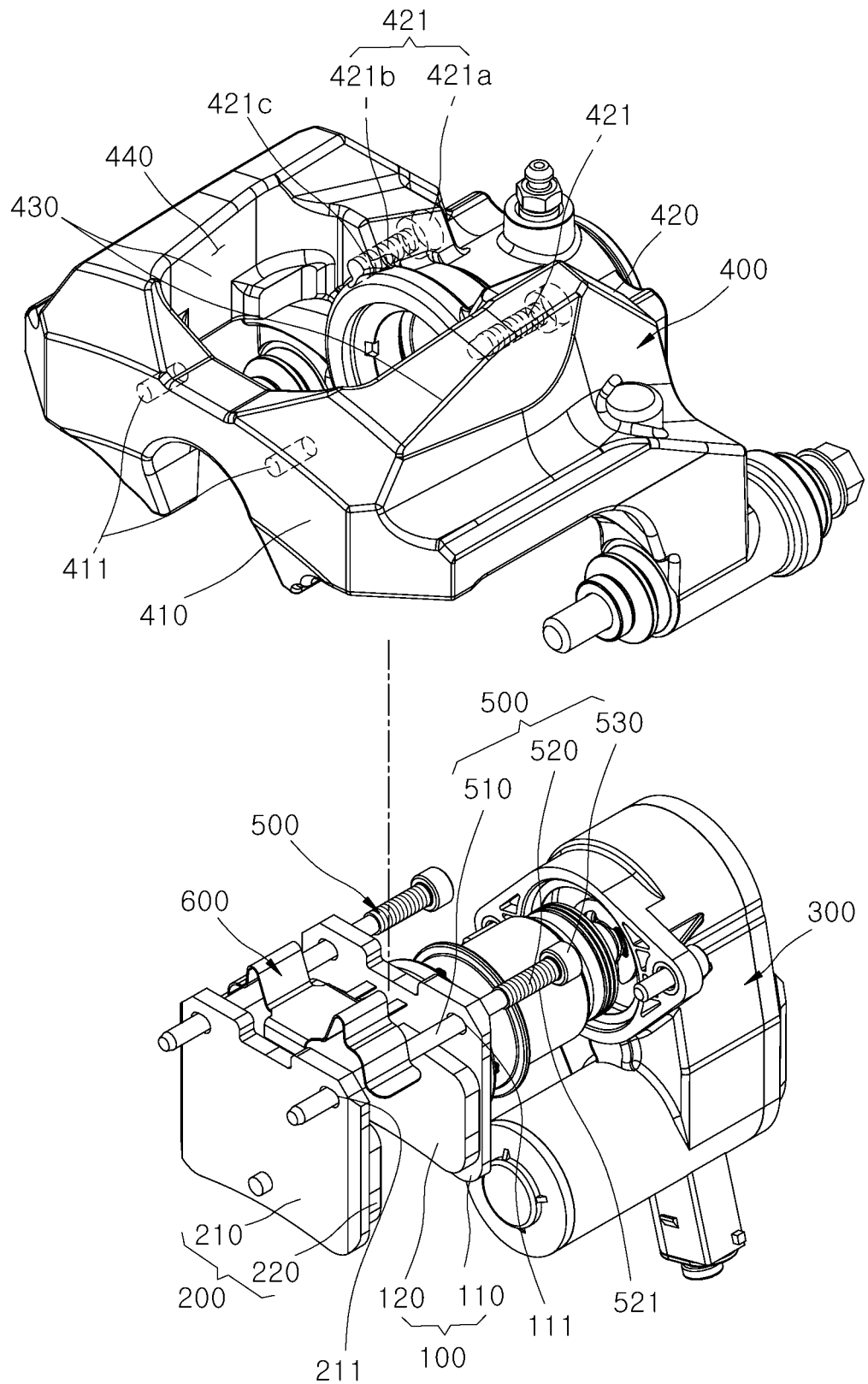
FIG. 4 is an exploded perspective view of the brake apparatus for a vehicle according to an embodiment of the present disclosure.
Figure 5:
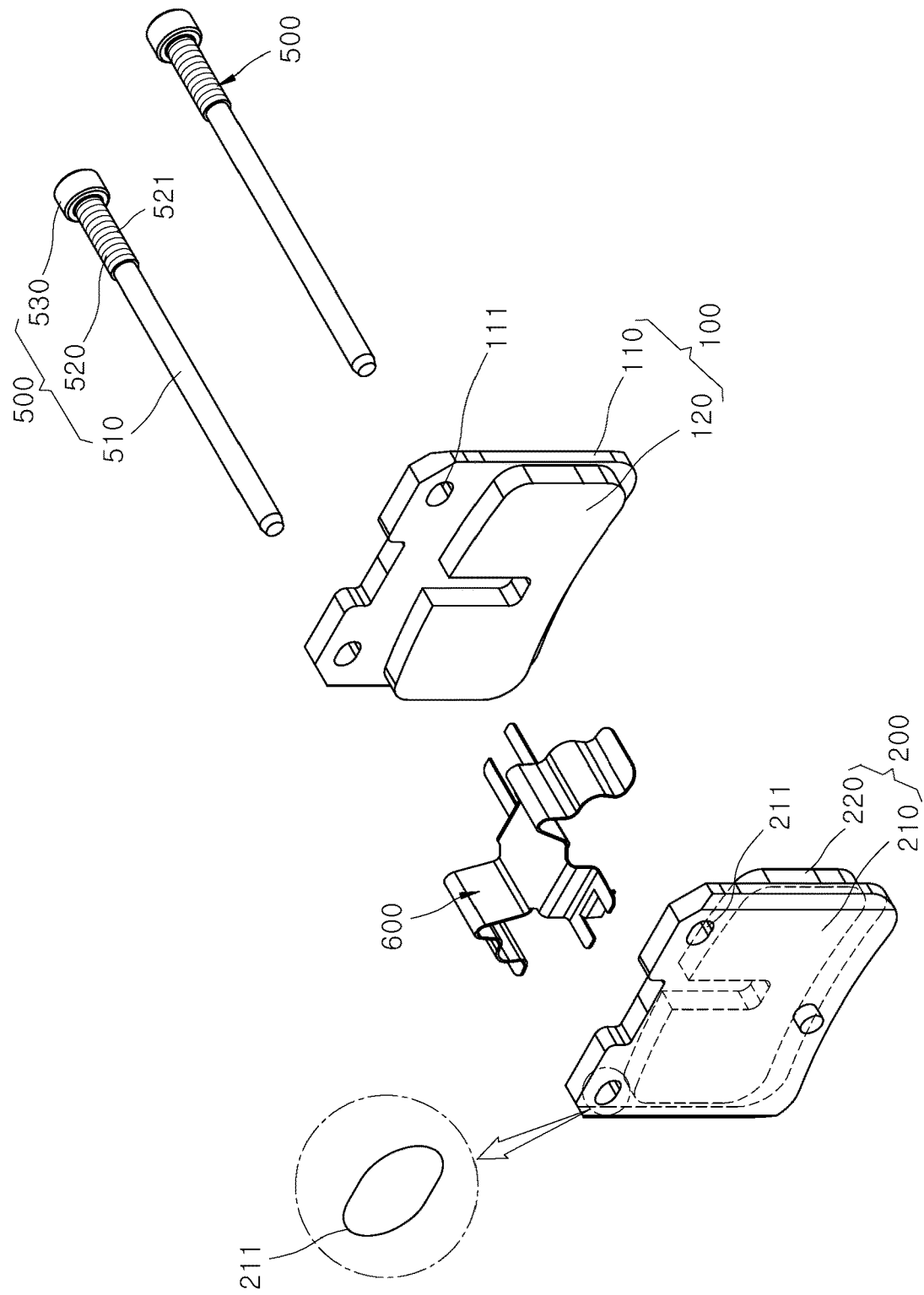
FIG. 5 is an exploded perspective view of a key part of FIG. 4.

FIG. 1 is a diagram schematically illustrating a brake apparatus for a vehicle according to an embodiment of the present disclosure. FIG. 2 is a cross-sectional view taken along line A-A' of FIG. 1. FIG. 3 is an enlarged view of a key part of FIG. 2. FIG. 4 is an exploded perspective view of the brake apparatus for a vehicle according to an embodiment of the present disclosure. FIG. 5 is an exploded perspective view of a key part of FIG. 4.

Referring to FIGS. 1 to 5, a brake apparatus for a vehicle 1 according to an embodiment of the present disclosure includes a first brake pad 100, a second brake pad 200, a pressing part 300, a caliper body 400, and a pair of pin members 500. The first brake pad 100 presses a brake disc 10. The first brake pad 100 is disposed on one side of the brake disc 10, and the pair of pin members 500 coupled to the caliper body 400 extends or passes through and are fastened to the first brake pad 100. In this case, the first brake pad 100 can be displaced toward or away from the brake disc 10 on the pair of pin members 500.

The second brake pad 200 is disposed to face the first brake pad 100, and comes into contact with the brake disc 10. The second brake pad 200 is disposed on the other side of the brake disc 10, and the pair of pin members 500 coupled to the caliper body 400 pass through and are fastened to the second brake pad 200.

The pressing part 300 presses the first brake pad 100 to move toward the second brake pad 200. The pressing part 300 is disposed (or mounted) on the caliper body 400, is configured to include a motor module (not illustrated), screw bars (not illustrated), nuts (not illustrated), and a piston (not illustrated), and can be variously modified as long as it presses the first brake pad 20.

The pressing part 300 is mounted on the caliper body 400, and the caliper body 400 encloses the first brake pad 100 and the second brake pad 200. The caliper body 400 includes a mounting hole part 440. The first brake pad 100 and the second brake pad 200 are disposed in the mounting hole part 440 so as to face each other. In this case, the first brake pad 100 and the second brake pad 200 are disposed on the opposite sides of the brake disc 10.

The caliper body 400 includes a first caliper body 410, a second caliper body 420, and a third caliper body 430. The first caliper body 410 has insertion holes 411 into which the pin members 500 are inserted. The first caliper body 410 is disposed in front of the second caliper body 420 (based on FIGS. 1 and 2) (to be described below). The insertion holes 411 are formed in the first caliper body 410 in a pair so as to be apart from each other.

The pressing part 300 is mounted on the second caliper body 420. The second caliper body 420 faces the first caliper body 410, and has coupling holes 421 to which the pin members 500 are screw-coupled. The second caliper body 420 is disposed in the rear of the first caliper body 410 (based on FIGS. 1 and 2). The coupling holes 421 are disposed in the second caliper body 420 in a pair so as to be apart from each other, and are located on the same line as the insertion holes 411.

The third caliper body 430 is disposed between the first caliper body 410 and the second caliper body 420 so as to be apart from each other, and connects the first caliper body 410 and the second caliper body 420. In this case, the first caliper body 410, the second caliper body 420, and the third caliper body 430 are integrally coupled to define a mounting hole part 440, in which the first brake pad 100 and the second brake pad 200 are disposed, in a central portion.

The pair of pin members 500 are screw-coupled to the caliper body 400 so as to be apart from each other, and passes through the first brake pad 100 and the second brake pad 200. To be specific, a pair of coupling holes 421 are formed in the caliper body 400. The pair of pin members 500 are screw-coupled to the coupling holes 421 of the caliper body 400. Thus, the pin members 500 can be easily coupled to or decoupled from the caliper body 400.

The pin members 500 are inserted into the insertion holes 411 via the coupling holes 421. That is, the pin members 500 are coupled in the order of the coupling holes 421 and the insertion holes 411. When each of the pin members 500 is rotated in a set direction, i.e., in a tightening direction, first threads 521 of each of the pin members 500 are meshedly coupled to second threads 421a of each of the coupling holes 421. Conversely, when each of the pin members 500 is rotated in a set direction, i.e., in an untightening direction, the first threads 521 of each of the pin members 500 can be untightened from the second threads 421a of each of the coupling holes 421.

In the present disclosure, as the pin members 500 are screw-coupled only to the coupling holes 421 of the second caliper body 420 in which the pressing part 300 is mounted, it is possible to improve assemblability while reducing a load of the threads.

Furthermore, in comparison with the related art in which the pin clips are required to couple the pin members 500 to the caliper body 400, without separate coupling components such as pin clips, the pin members 500 can be coupled to the caliper body 400, the number of components is reduced, and thus manufacturing costs can be saved. Further, in comparison with the related art, the assembling and disassembling processes are simplified, and an assembly time can be reduced.

Each of the pin members 500 includes a pin body 510, a pin coupler 520, and a pin head 530. The pin body 510 passes through the first brake pad 100 and the second brake pad 200, and is inserted into the insertion hole 411. The pin body 510 has a cylinder shape, and passes through a first through-hole part 111 of the first brake pad 100 and a second through-hole part 211 of the second brake pad 200.

The pin coupler 520 is connected to the pin body 510, and is screw-coupled to the coupling hole 421. The pin coupler 520 is provided with first threads 521. Second threads 421c coupled to be engaged with the first threads 521 of the pin coupler 520 are formed in the coupling holes 421 of the caliper body 400.

The coupling hole 421 includes a first coupling hole 421a and a second coupling hole 421b. The pin head 530 is disposed in the first coupling hole 421a. Each of the second coupling holes 421b is connected to each of the first coupling holes 421a, and is formed with second threads 421c.

A length L1 of the pin coupler 520 is shorter than a length L2 of the second coupling hole 421b (see FIG. 3). For this reason, it is possible to prevent the pin coupler 520 from protruding to the outside of the caliper body 400.

The pin head 530 is connected to the pin coupler 520, is larger than the pin coupler 520, and comes into contact with the caliper body 400. In this case, the first coupling hole 421a has a larger diameter than the second coupling hole 421b. For this reason, a step 421d can be formed in the first coupling hole 421a. Thus, when the pin member 500 is coupled to the coupling hole 421 over a set depth, the pin head 530 is caught by the step 421d of the first coupling hole 421a, so that the pin member 500 can be prevented from being coupled in the coupling hole 421 past a set depth.

The first brake pad 100 includes a first back plate 110 and a first friction member 120. The first back plate 110 has a pair of first through-hole parts 111 that protrude a pair of pin members 500 in an elongated shape. Moreover, since the first through-hole part 111 has a long hole shape in a lateral (left-right) direction (see FIG. 5), the pin members 500 can be protected from an influence of torque.

The first back plate 110 may be disposed on one side of the brake disc 10. In this case, the first back plate 110 is fastened to the caliper body 400 by the pin member 500. The pin member 500 is fastened to the caliper body 400 after the first back plate 110 passes through the first through-hole part 111. The first back plate 110 can be displaced toward the brake disc 10 on the pin member 500 by a pressing force of the pressing part 300, or toward the opposite side of the brake disc 10 by a release of the pressing force of the pressing part 300.

The first friction member 120 is coupled to the first back plate 110, and comes into contact with the brake disc 10. The first friction member 120 is formed of or includes, for instance, an elastic material, and presses one side of the brake disc 10.

The second brake pad 200 includes a second back plate 210 and a second friction member 220. The second back plate 210 has a pair of second through-hole parts 211 formed in an elongate hole through that the pin member 500 passes. Since the second through-hole parts 211 are shaped of a long hole shape that is elongated in left-right direction (see FIG. 5), the pin members 500 can minimized from an influence of the torque.

The second back plate 210 is coupled to the caliper body 40, and may be disposed on the other side of the brake disc 10. In this case, the second back plate 210 is fastened to the caliper body 400 by the pin members 500. The pin members 500 pass through the second through-hole part 211 of the second back plate 210, and are fastened to the caliper body 400.

The second friction member 220 is coupled to the second back plate 210, and comes into contact with the brake disc 10. The second friction member 220 is formed of an elastic material, and comes into contact with the other side of the brake disc 10.

The brake apparatus 1 for a vehicle further includes a brake pad clip part 600, which is mounted on the pair of pin members 500, and presses the first brake pad 100 and the second brake pad 200. The brake pad clip part 600 presses upper sides of the first brake pad 100 and the second brake pad 200 (see FIG. 1) so as to apply a load, and can prevent generation of rattle noise.

While the present disclosure has been described with reference to the embodiments illustrated in the drawings, this disclosure is merely illustrative. Those skilled in the art will appreciate that various modifications, additions and substitutions are possible, without departing from the scope and spirit of the disclosure as defined in the accompanying claims.

Thus, the genuine technical scope of the present disclosure should be defined from the accompanying claims.

What is claimed is:

1. A brake apparatus for a vehicle, comprising:
a first brake pad configured to press a brake disc;
a second brake pad facing the first brake pad and in contact with the brake disc;
a pressing part configured to press the first brake pad toward the second brake pad;
a caliper body enclosing the first and second brake pads, wherein the pressing part is disposed on the caliper body; and
a pair of pin members screw-coupled to the caliper body and extending through the first and second brake pads,
wherein the caliper body comprises:
a first caliper body having a pair of insertion holes into which the pair of pin members respectively extends,
a second caliper body facing the first caliper body and having a coupling hole part, wherein the pressing part is disposed on the second caliper body, and the pair of pin members is screw-coupled to the second caliper body at the coupling hole part, and
a third caliper body disposed between the first and second caliper bodies, and interconnecting the first and second caliper bodies,
wherein each of the pin members comprises:
a pin body extending into one of the insertion holes through the first and second brake pads,
a pin coupler connected to the pin body and screw-coupled to the coupling hole part, and
a pin head connected to the pin coupler and in contact with the caliper body,
wherein the pin head is larger than the pin coupler,
wherein:
the pin coupler has first threads, and
the coupling hole part has second threads coupled to the first threads of the pin coupler, and
wherein the coupling hole part comprises:
a first coupling hole part at which the pin head is disposed, and
a second coupling hole part connected to the first coupling hole part, wherein the second threads are disposed at the second coupling hole part.

2. The brake apparatus of claim 1, wherein the pin coupler is shorter than the second coupling hole part.

3. The brake apparatus of claim 1, wherein the first brake pad comprises:
a first back plate having a pair of first through-hole parts through which the pair of pin members extends; and
a first friction member coupled to the first back plate and in contact with the brake disc.

4. The brake apparatus of claim 3, wherein:
the first through-hole part is elongated in a lateral direction; and
the first friction member comprises an elastic material.

5. The brake apparatus of claim 1, wherein the second brake pad comprises:
a second back plate having a pair of second through-hole parts, wherein the pair of pin members respectively extends through the pair of second through-hole parts; and a second friction member coupled to the second back plate and in contact with the brake disc.

6. The brake apparatus of claim 5, wherein:
the second through-hole part is elongated in a lateral direction; and
the second friction member comprises an elastic material.

7. The brake apparatus of claim 1, further comprising a brake pad clip section mounted on the pair of pin members and pressing the first and second brake pads.

* * * * *